United States Patent
Shome et al.

(10) Patent No.: US 9,919,505 B2
(45) Date of Patent: Mar. 20, 2018

(54) APPARATUS AND METHOD FOR A SHAPE MEMORY ALLOY MANDREL

(71) Applicant: THE BOEING COMPANY, Chicago, IL (US)

(72) Inventors: Moushumi Shome, Kent, WA (US); Sahrudine Apdalhaliem, Seattle, WA (US); Frederick T. Calkins, Renton, WA (US); Waeil M. Ashmawi, Bellevue, WA (US); Kimberly Meredith, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 690 days.

(21) Appl. No.: 14/340,914

(22) Filed: Jul. 25, 2014

(65) Prior Publication Data

US 2016/0023406 A1 Jan. 28, 2016

(51) Int. Cl.
*B29C 70/34* (2006.01)
*B29C 70/54* (2006.01)
(Continued)

(52) U.S. Cl.
CPC .......... *B32B 37/1036* (2013.01); *B29C 33/38* (2013.01); *B29C 33/485* (2013.01);
(Continued)

(58) Field of Classification Search
CPC ................................................. B29C 33/485
(Continued)

(56) References Cited

U.S. PATENT DOCUMENTS

| 5,700,337 A | 12/1997 | Jacobs et al. |
| 7,422,714 B1 * | 9/2008 | Hood ............ B29C 33/40 264/219 |

(Continued)

FOREIGN PATENT DOCUMENTS

| JP | 61076351 | 4/1986 |
| JP | 61215043 | 9/1986 |
| JP | 04364929 | 12/1992 |

OTHER PUBLICATIONS

Hartl, et al. "Characterization and 3-D Modeling of Ni60Ti SMA for Actuation of a Variable Geometry Jet Engine Chevron". SPIE Proceedings, vol. 6529, Sensors and Smart Structures Technologies for Civil, Mechanical, and Aerospace Systems, 2007.
Gardiner, Ginger "Thermoplastic Composites: Primary Structure?"; CompositeWorld, May 2011, http://www.compositesworld.com/articles/thermoplastic-composites-primary-structure.
European Search Report, European Application No. 15170688, dated Dec. 11, 2015.

*Primary Examiner* — Matthew J Daniels
*Assistant Examiner* — Marta S Dulko
(74) *Attorney, Agent, or Firm* — Perman & Green, LLP

(57) ABSTRACT

In one or more aspects of the present disclosure, a mandrel is disclosed. The mandrel having a shape memory alloy (SMA) shell having a longitudinal axis, an interior extending along the longitudinal axis and an exterior contour, the SMA shell being configured to interface with a structure to be cured, and at least one SMA actuation member disposed within the interior and connected to the SMA shell, where the at least one SMA actuation member is configured to exert pressure against the SMA shell effecting an interface pressure between the exterior contour of the SMA shell and the structure to be cured where the exterior contour has a predetermined actuated shape that corresponds to a predetermined cured shape of the structure to be cured.

20 Claims, 12 Drawing Sheets

(51) Int. Cl.
  *B32B 37/00* (2006.01)
  *B32B 37/10* (2006.01)
  *B32B 37/18* (2006.01)
  *B29C 33/38* (2006.01)
  *B29C 33/48* (2006.01)
  *B29C 70/44* (2006.01)
  *B29L 31/30* (2006.01)

(52) U.S. Cl.
  CPC ............ *B29C 70/446* (2013.01); *B29C 70/54* (2013.01); *B32B 37/0046* (2013.01); *B32B 37/18* (2013.01); *B29K 2905/00* (2013.01); *B29L 2031/3076* (2013.01); *B32B 2605/18* (2013.01); *Y02T 50/433* (2013.01)

(58) Field of Classification Search
  USPC ........................................................ 156/382
  See application file for complete search history.

(56) References Cited

U.S. PATENT DOCUMENTS

| | | | |
|---|---|---|---|
| 7,550,189 B1* | 6/2009 | McKnight | B32B 3/10 |
| | | | 148/563 |
| 8,434,293 B2 | 5/2013 | Widdle, Jr. et al. | |
| 2004/0197519 A1* | 10/2004 | Elzey | B32B 3/28 |
| | | | 428/68 |
| 2008/0145204 A1* | 6/2008 | Clark | F01D 5/148 |
| | | | 415/48 |
| 2011/0030380 A1* | 2/2011 | Widdle, Jr. | F02K 1/10 |
| | | | 60/771 |
| 2012/0118491 A1 | 5/2012 | Everhart et al. | |
| 2012/0119417 A1* | 5/2012 | Everhart | B29C 33/485 |
| | | | 264/313 |
| 2013/0074572 A1* | 3/2013 | Bottome | B29C 33/485 |
| | | | 72/379.2 |
| 2013/0145760 A1* | 6/2013 | Gondo | F03G 7/065 |
| | | | 60/528 |

* cited by examiner

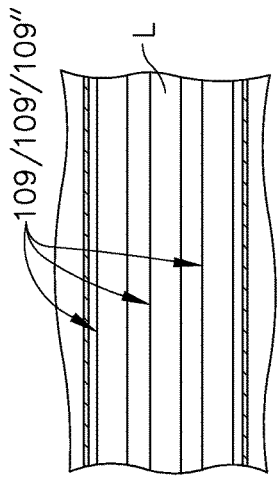
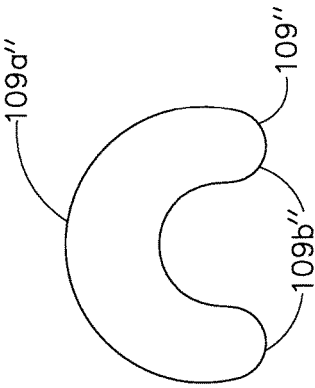
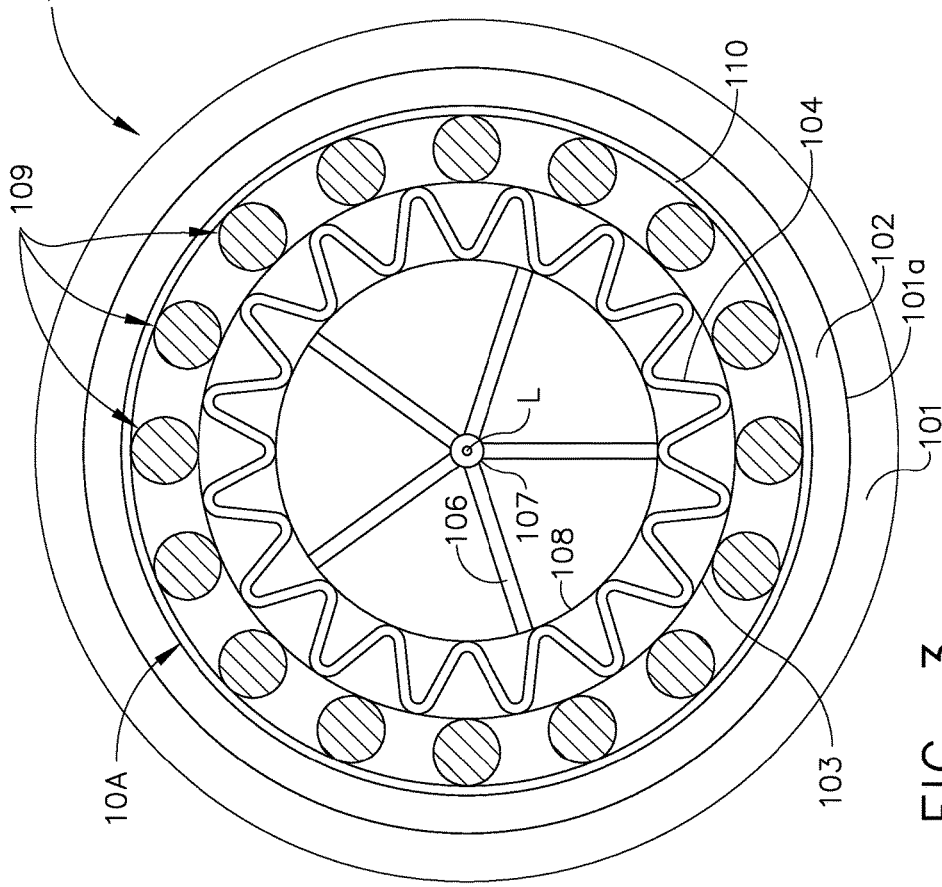

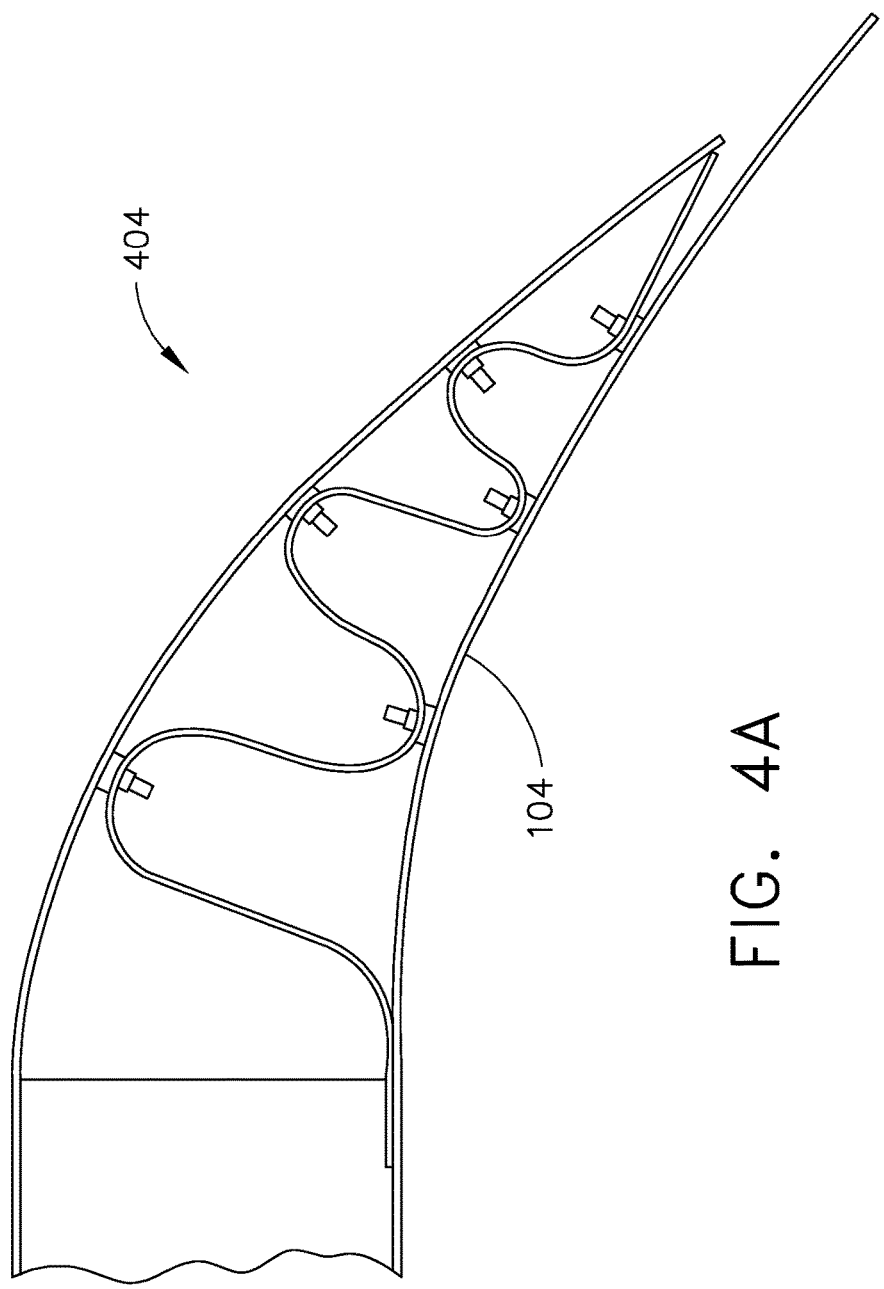

APPARATUS AND METHOD FOR A SHAPE MEMORY ALLOY MANDREL

FIELD

The aspects of exemplary embodiment generally relate to mandrels used in forming cured structures and, more particularly, to mandrels having shape memory alloy actuators.

BACKGROUND

Mandrels are often employed when there is a need for shaping manufactured products. Mandrels may be configured to create cured and shaped products, for instance, cured braided composite structures, thermoplastics, resin structures or any other suitable or similar materials. Mandrels can often be configured to shape the materials into a desired shape or configuration by providing actuation on the materials (for instance, composite materials) against a rigid actuation shell or form during the curing process. The pressure exerted by a mandrel against the composite material and the actuation shell or form may allow for the formation of a predetermined shape, geometry or configuration of the finished composite material. Currently, the prior art mandrels employed in the shaping of composite materials often employ a chemical reaction within the mandrel to provide actuation pressure on the composite material against the rigid actuation shell. The chemical reaction may be achieved, for example, through a soluble expandable mandrel using silicone within the actuation shell or form, or any other suitable means of generating actuation pressure with the mandrel. However, this method presents several disadvantages. Referring to FIG. 1, several examples of shaped composite structures formed by chemically actuated mandrels are shown. The chemical reactions actuating a conventional mandrel may not be sufficient to provide uniform pressure along the interior of the actuation shell. The non-uniform pressure may result in difficulties in producing uniform thickness in the composite structure formed by a conventional mandrel (see, for instance, FIGS. 1A-C).

Chemical reactions actuating a conventional mandrel may also present problems related to precision control of the pressures exerted by the conventional mandrel. Due to the nature of the chemical reaction, the pressure applied by a conventional mandrel may be uneven and difficult to control. Where shapes of the conventional mandrels are complex and have non-uniform cross sections, it may often be difficult to provide a constant pressure along the entire length of the mandrel as the chemical reaction causes the mandrel to actuate (for example, see FIG. 1C).

SUMMARY

Accordingly, a mandrel having shape memory alloy actuators for curing a composite structure, intended to address the above-identified concerns, would find utility.

In one or more aspects of the present disclosure, a mandrel is disclosed. The mandrel having a shape memory alloy (SMA) shell having a longitudinal axis, an interior extending along the longitudinal axis and an exterior contour, the SMA shell being configured to interface with a structure to be cured, and at least one SMA actuation member disposed within the interior and connected to the SMA shell, where the at least one SMA actuation member is configured to exert pressure against the SMA shell effecting an interface pressure between the exterior contour of the SMA shell and the structure to be cured where the exterior contour has a predetermined actuated shape that corresponds to a predetermined cured shape of the structure to be cured.

In one or more aspects of the present disclosure, a mandrel is disclosed. The mandrel having a first shape memory alloy (SMA) shell having a longitudinal axis, an exterior contour and forming an interior space, the exterior contour of the first SMA shell being configured to interface with a composite to be cured, and at least one SMA actuation member disposed within the interior space and being configured to effect regions of expansion pressure against the first SMA shell and effecting a transfer of expansion pressure to the composite to be cured.

In one or more aspects of the present disclosure, a method of forming a composite structure to be cured is disclosed. The method including placing the composite structure to be cured around a shape memory alloy (SMA) mandrel, and exerting a pressure against an SMA shell of the SMA mandrel so that the pressure is transferred to the composite structure to be cured by an exterior contoured surface of the SMA mandrel with at least one SMA member of the SMA mandrel where the exterior contour has a predetermined actuated shape that corresponds to a predetermined cured shape of the composite structure.

In one or more aspects of the present disclosure, a method of tailoring pressure on a structure with a shape memory alloy (SMA) mandrel is disclosed. The method including defining a geometry of a composite structure to be cured during a curing process, identifying pressures and temperatures for the curing process for the composite structure, designing the SMA mandrel by matching the SMA mandrel with the identified pressures and temperatures where the SMA mandrel is contoured to a cured geometry of the composite structure, and assembling the SMA mandrel, placing the assembled SMA model within the composite structure to be cured so that a contoured exterior surface of the SMA mandrel is in contact with the composite structure, and curing the composite structure.

In one or more aspects of the present disclosure, a system for forming a composite structure is disclosed, the system having an actuation shell having an interior extending along a longitudinal axis and an interior contour corresponding to a predetermined cured shape of the composite structure, a shape memory alloy (SMA) shell having a longitudinal axis, an interior extending along the longitudinal axis and an exterior contour having a predetermined shape, the SMA shell being configured to interface with a composite structure to be cured, and at least one SMA actuation member disposed within the interior and connected to the SMA shell, where the at least one SMA actuation member is configured to exert pressure against the SMA shell effecting an interface pressure between the exterior contour of the SMA shell and the interior contour of the actuation shell to compress the composite structure for curing the composite structure and effecting the predetermined cured shape of the composite structure where the exterior contour has a predetermined actuated shape that corresponds to the predetermined cured shape of the composite structure.

BRIEF DESCRIPTION OF THE DRAWINGS

Figure 1A:
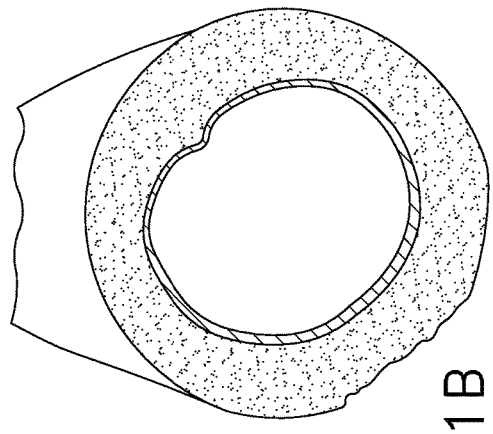
Figure 1B:
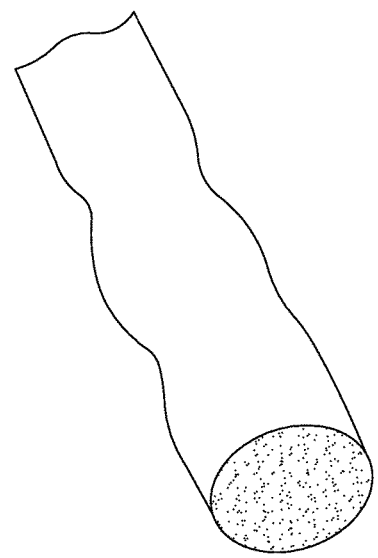
Figure 1C:
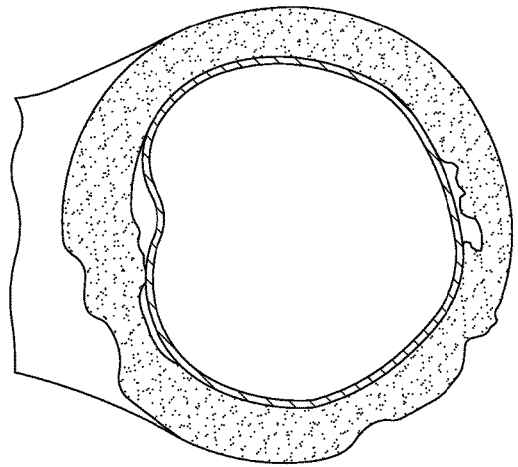
Figure 2:
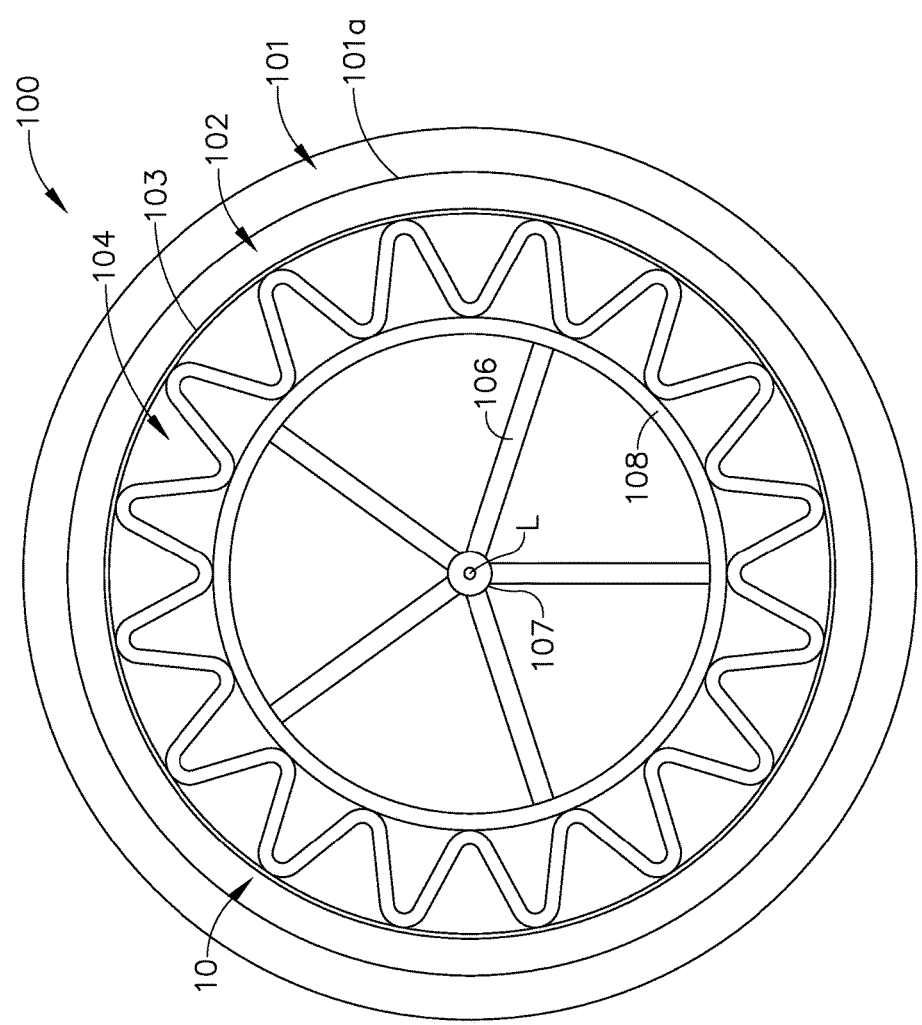
Figure 2A:
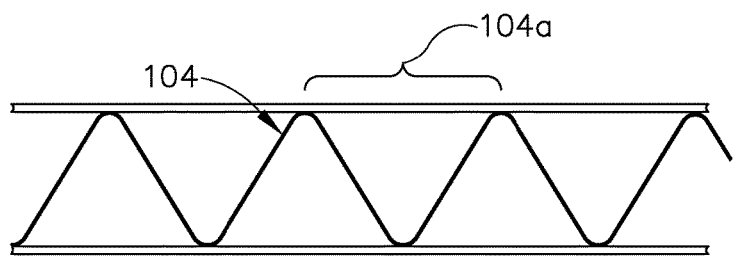
Figure 2B:
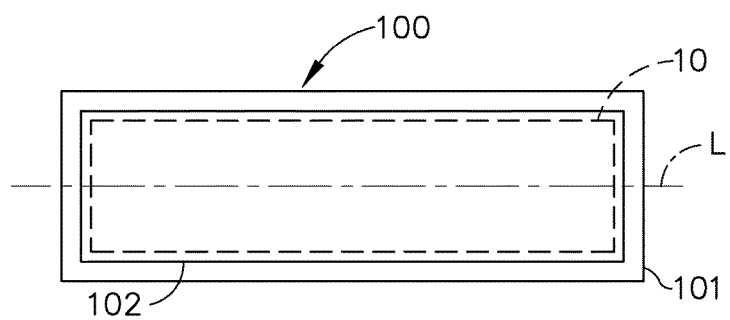
Figure 2C:
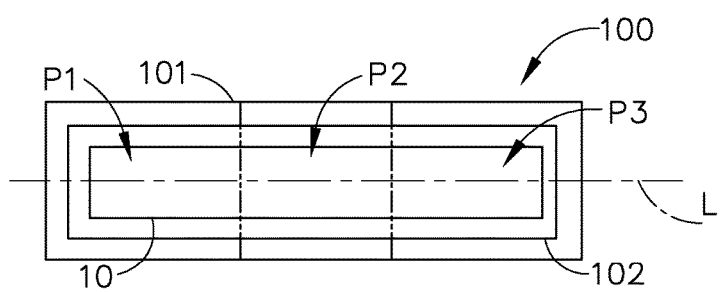
Figure 2D:
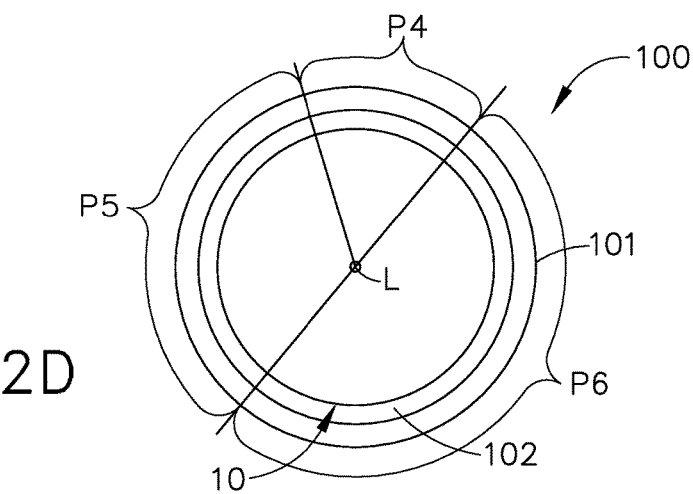
Figure 4:
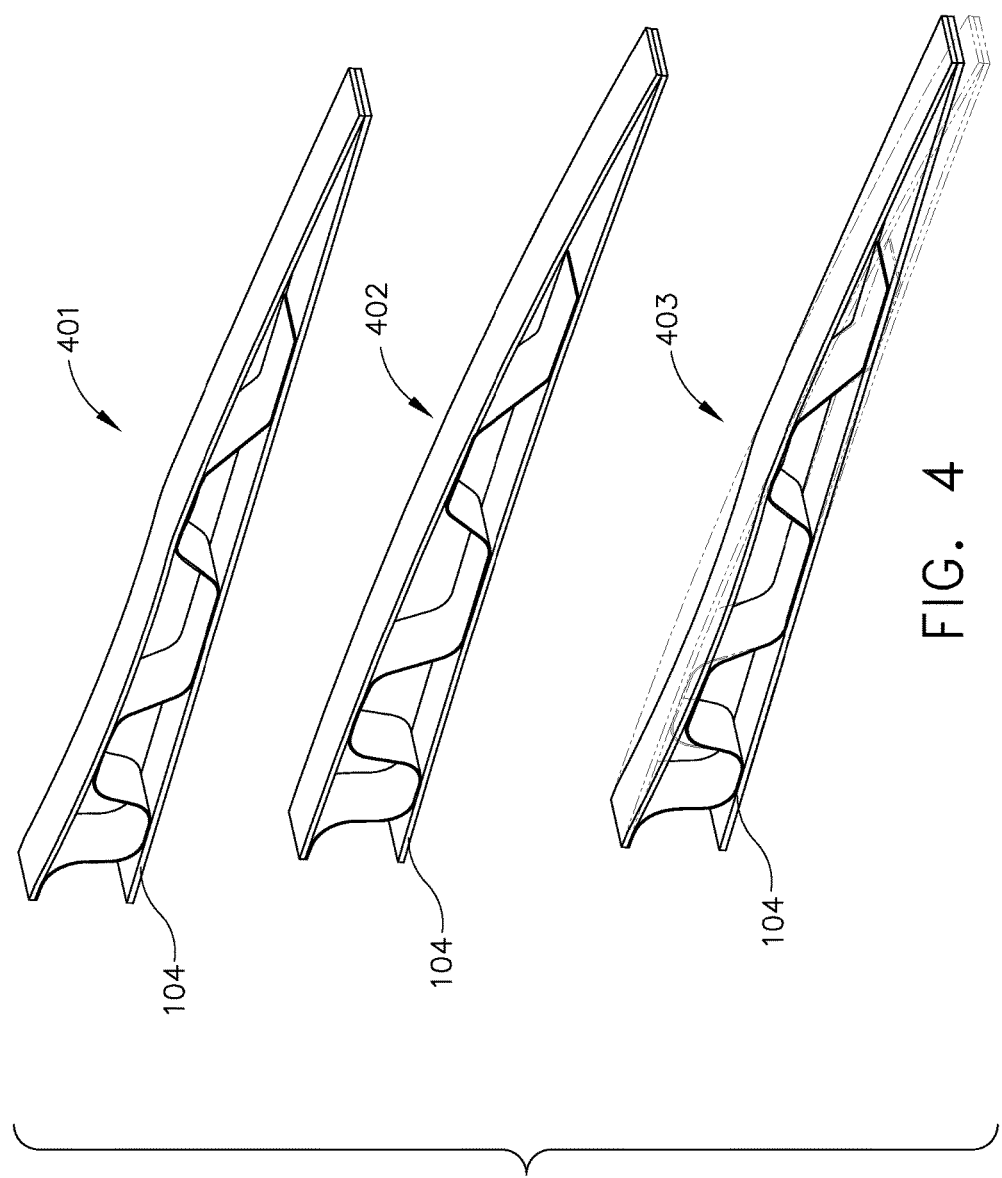
Figure 4B:
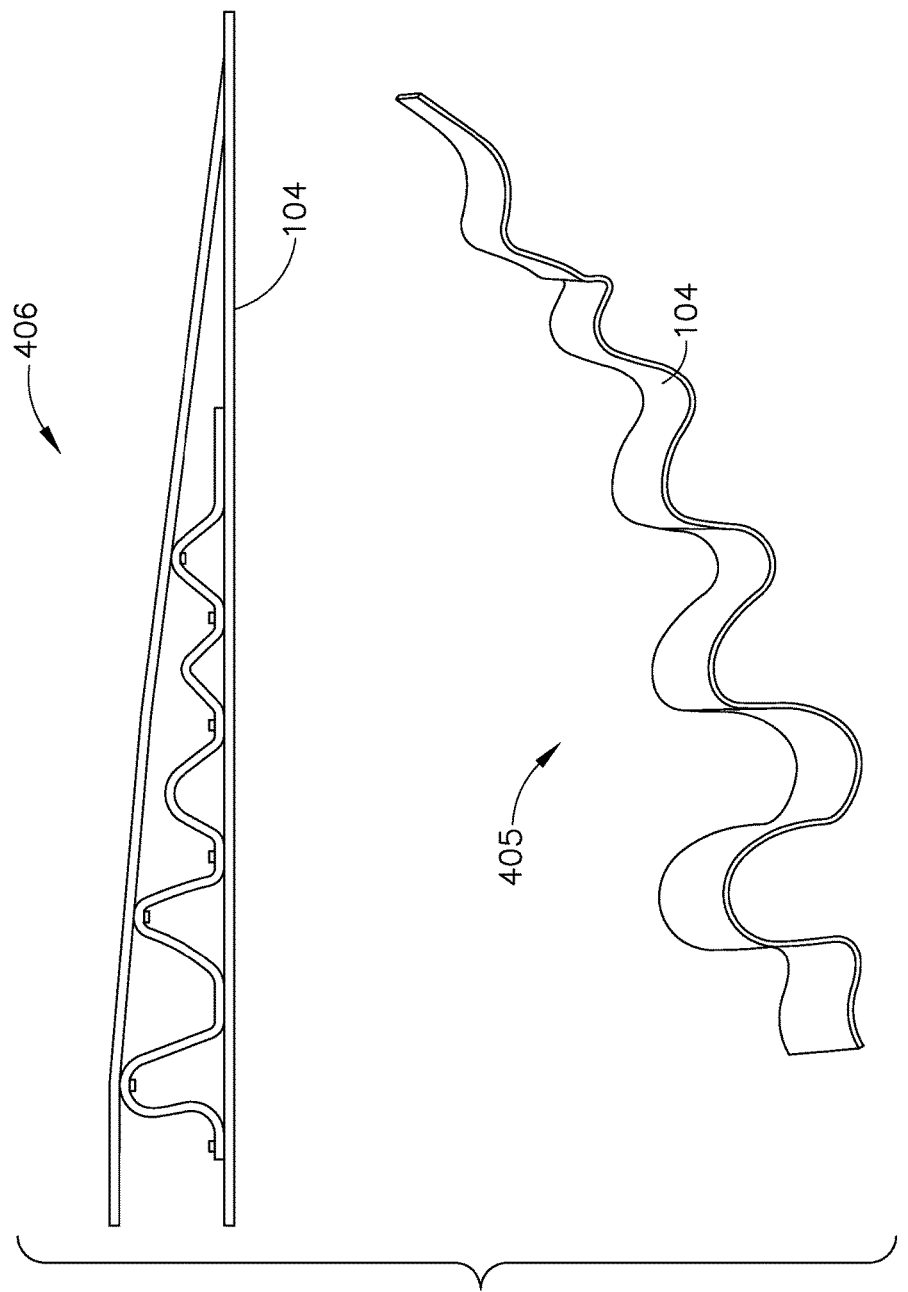
Figure 4C:
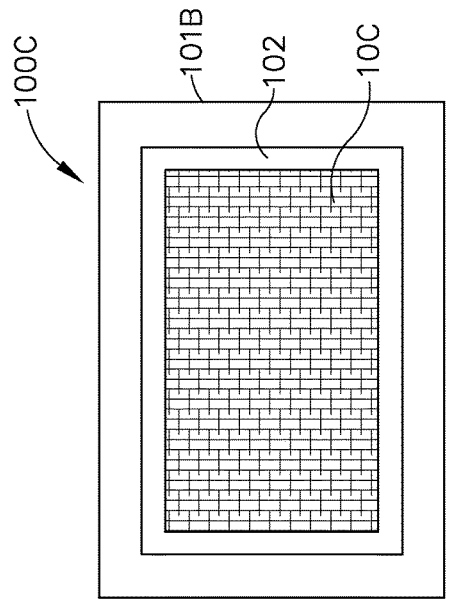
Figure 4D:
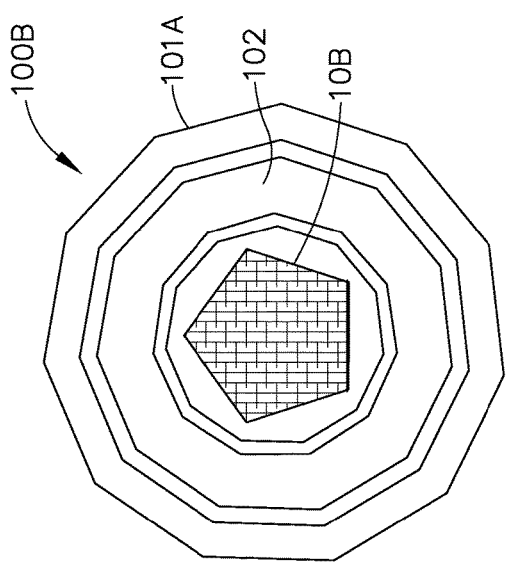
Figure 4E:
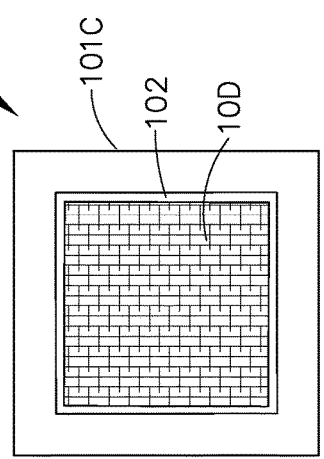
Figure 5:
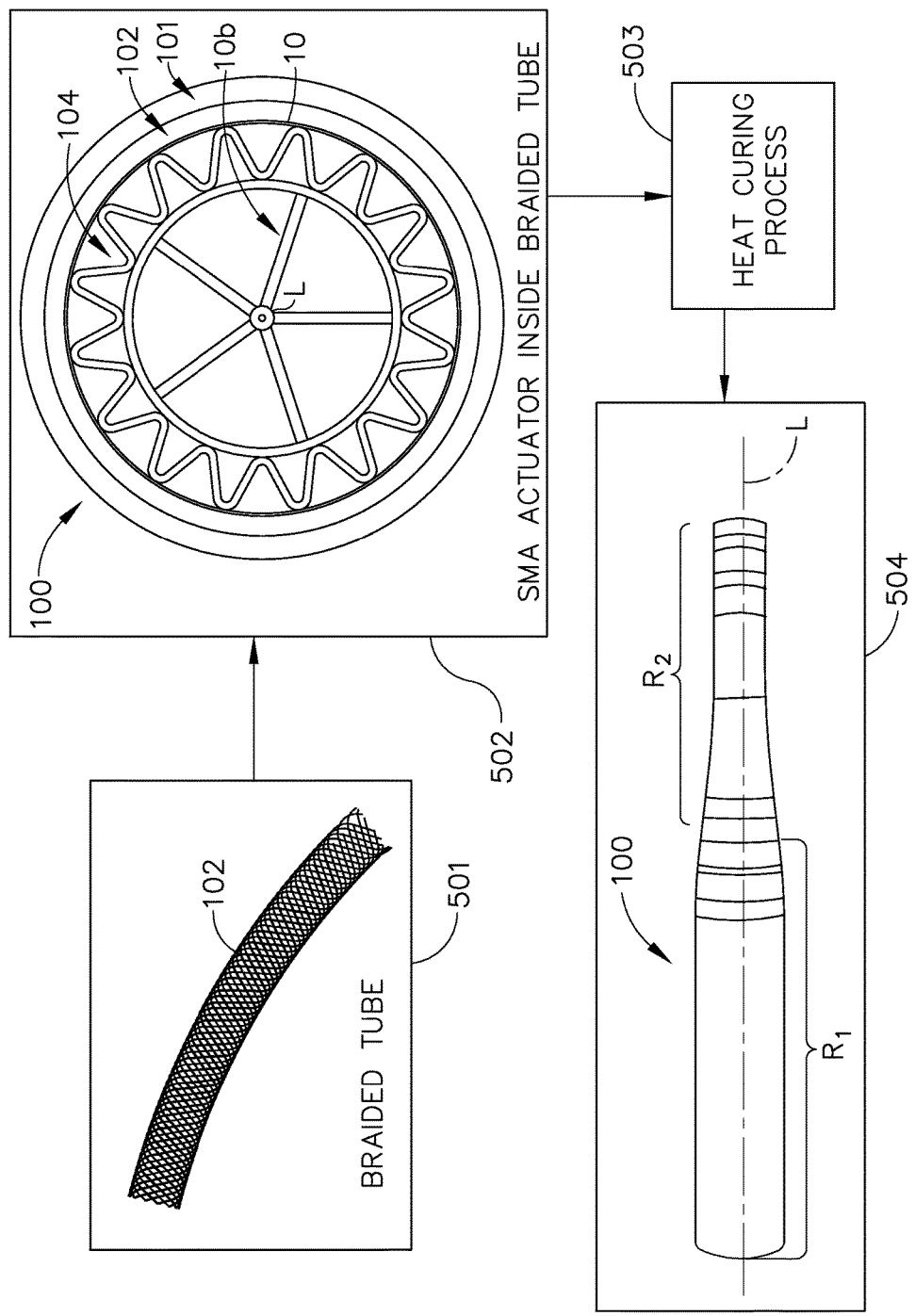
Figure 6:
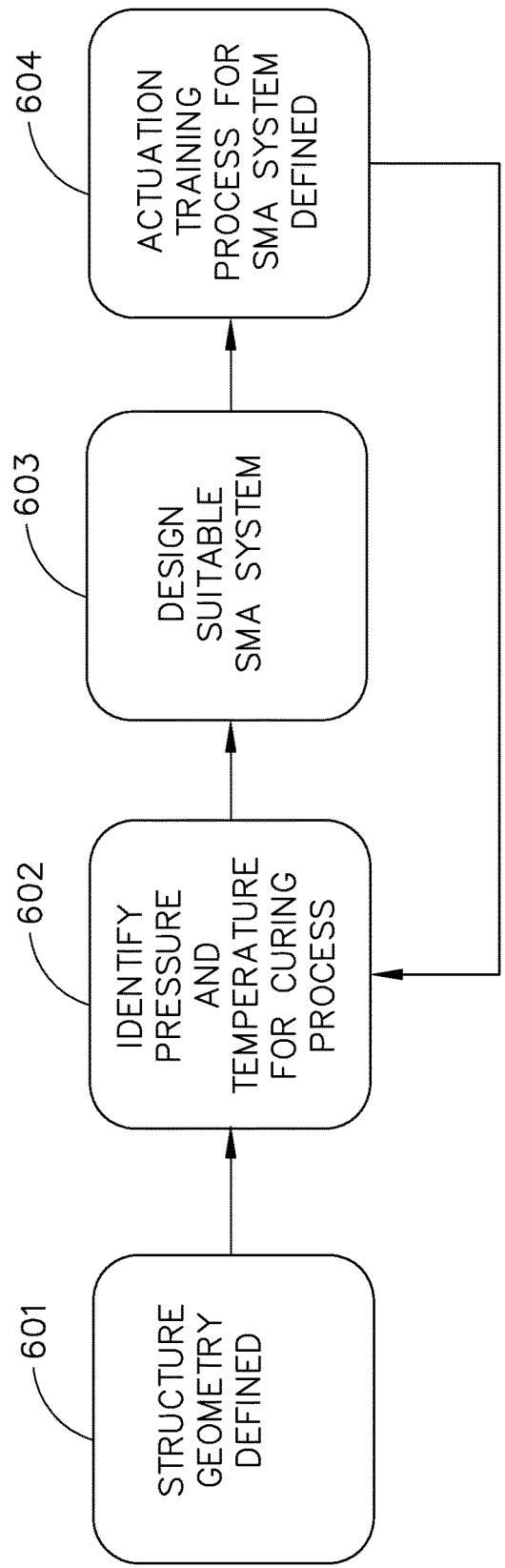
Figure 7:
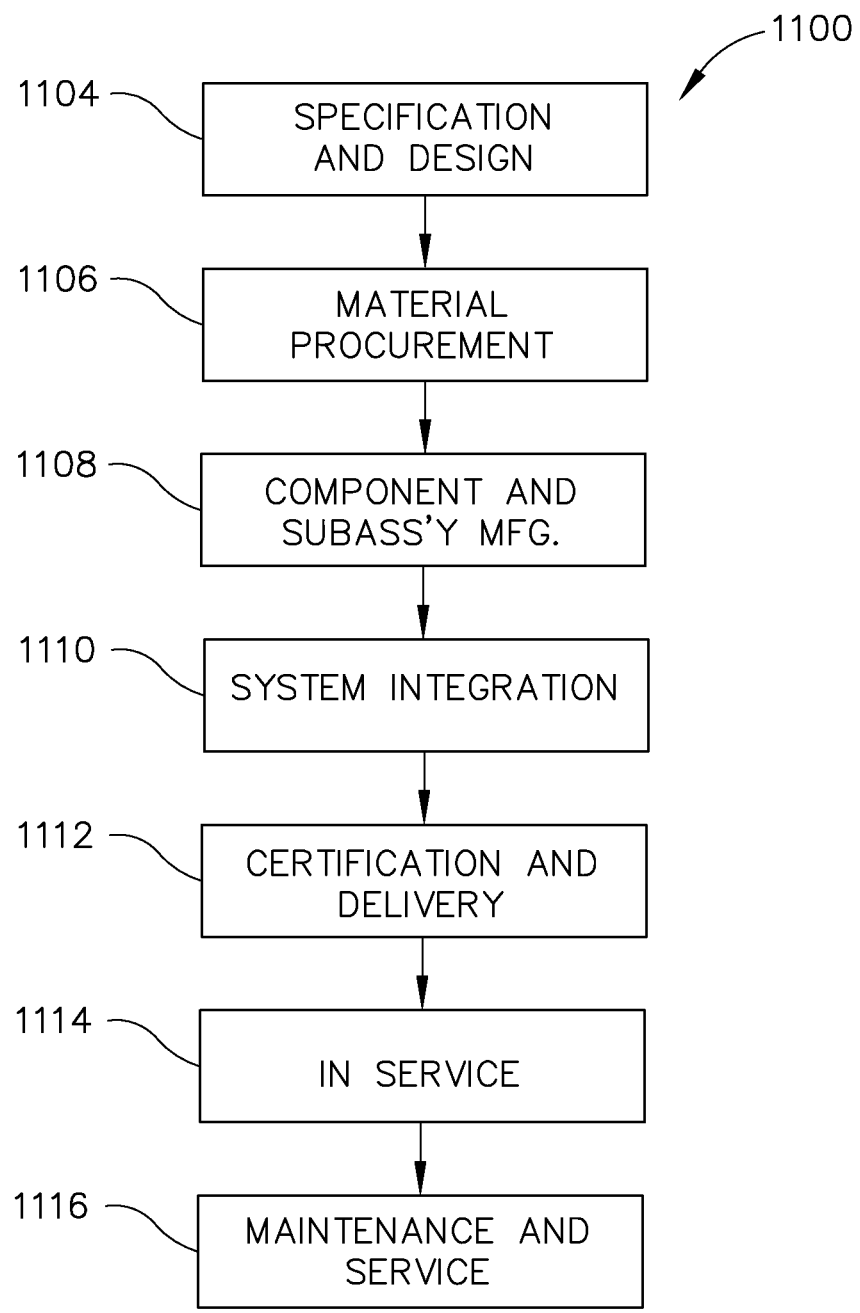
Figure 8:
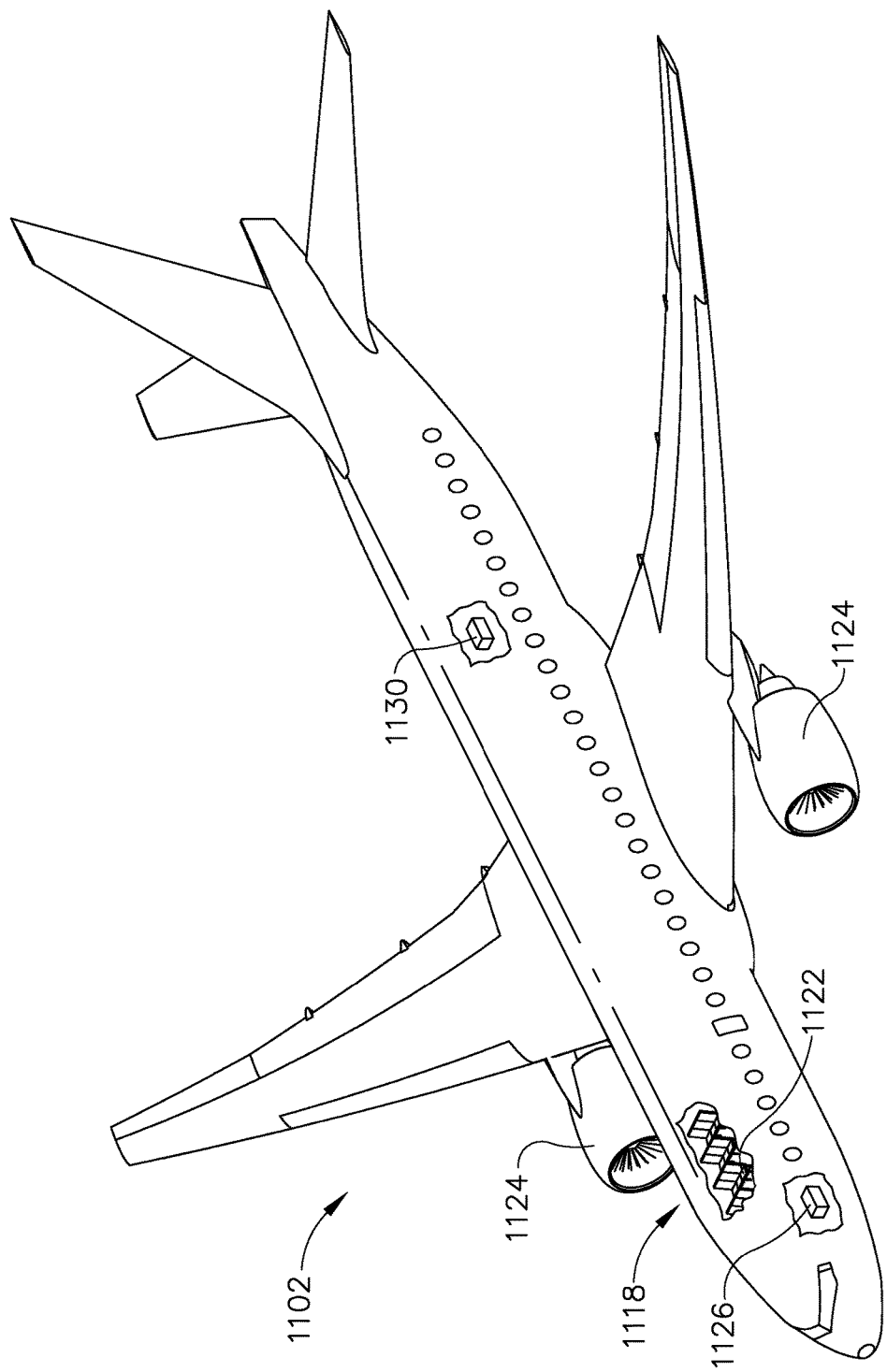

Having thus described examples of the disclosure in general terms, reference will now be made to the accompanying drawings, which are not necessarily drawn to scale, and wherein like reference characters designate the same or similar parts throughout the several views, and wherein:

FIGS. 1A-C are an exemplary illustrations of prior art composite structures created with a conventional mandrel;

FIG. 2 is an exemplary cross-sectional diagram illustrating a shape memory alloy mandrel according to aspects of the present disclosure;

FIG. 2A-D are exemplary cross-sectional diagrams of a sinusoidal shape memory alloy actuation member according to aspects of the present disclosure;

FIG. 3 is an exemplary cross-sectional diagram illustrating another shape memory alloy mandrel according to aspects of the present disclosure;

FIGS. 3A-B are exemplary cross-sectional diagrams of a shape memory alloy actuation member according to aspects of the present disclosure;

FIG. 4 is an exemplary illustration showing the design of a shape memory alloy actuation member according to aspects of the present disclosure;

FIG. 4A is an exemplary illustration showing a shape memory alloy actuation member according to aspects of the present disclosure;

FIG. 4B is an exemplary illustration of a shape memory alloy actuation member according to aspects of the present disclosure;

FIG. 4C-E are exemplary illustrations of shape memory alloy mandrels having different cross-sectional shapes in accordance with aspects of the present disclosure;

FIG. 5 is an exemplary flow chart showing a composite curing process according to aspects of the present disclosure;

FIG. 6 is an exemplary flow chart showing the design of a shape memory alloy mandrel, according to aspects of the present disclosure;

FIG. 7 is a flow diagram of aircraft production and service methodology in accordance with aspects of the present disclosure;

FIG. 8 is a schematic illustration of an aircraft in accordance with aspects of the present disclosure;

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring now to FIG. 2, a shape memory alloy mandrel 10 of a compaction unit 100 (i.e. a unit for curing a composite structure) for a structure curing process is shown. Shape memory alloys (otherwise known as SMA, smart metal, memory metal and memory alloy) are a classification of materials that can change shape, position, stiffness and a number of mechanical properties in response to certain changes. For instance, for certain SMAs, changes in mechanical properties may be in response to a change in temperature or exposure to electromagnetic fields. SMA mandrels may be a solid-state substitute for chemical reaction mandrels on account of their property of returning to a "memory" shape when certain conditions are met, for instance, when an SMA structure is exposed to a certain temperature. SMAs may be tailored to provide certain pressures at certain positions by "training" the SMA structure to behave in a controlled manner between the phase transition from martensite to austenite states (and back again) without compromising certain material properties. When properly tailored, the SMA structures may exert high pressure during the deflection as it transitions between martensite and austenite states and may deflect faster than conventional (i.e. chemical reaction-based) mandrels. For instance, pressure provided by the deflection of an SMA structure may be up to about 100 Ksi (or greater) to surrounding structures during the phase transition. Further, as the SMA structure actuates mechanically, from the inside out or outside in, the deflection during actuation may be carried out in a controlled manner as opposed to conventional mandrels which rely on chemical reactions for pressure.

SMAs may include, for instance, Nickel Titanium Alloys that exhibit reversible solid state phase transformation under prescribed conditions. During the phase transition, the alloy may undergo pronounced and reversible change in shape at the structural level, producing reversible characteristics and performance appropriate for curing materials. The phase transitions for Nickel Titanium Alloys may occur over the temperature ranges of approximately 20-30 C and the alloy may be pre-treated to allow transition temperatures to be relatively high (approximately 60-80 C) or relatively low (approximately 20-0 C). However, in alternate aspects of the present disclosure, any suitable shape memory alloy or material may be configured to act as a SMA mandrel, including, but not limited to, SMA of alloys of zinc, copper, gold and iron. In alternate aspects of the present disclosure, shape memory polymers may also be configured to act as a SMA mandrel.

Referring again to FIGS. 2 and 2B, the shape memory alloy mandrel 10 has an axially extending hub 107, which is arranged to extend substantially along a longitudinal axis L of the shape memory alloy mandrel 10. The axially extending hub 107 may be made from any suitable material. In an aspect of the present disclosure, the axially extending hub 107 may be comprised from metal or other materials which may be able to withstand high temperature or high pressure situations. In another aspect of the present disclosure, the axially extending hub 107 may also be comprised of an SMA, which may provide actuation during the curing process.

The shape memory alloy mandrel 10 also has shape memory alloy fins 106 which are communicably interfaced with, connected, or otherwise attached to an axially extending hub 107 so that the axially extending hub 107 radially supports the shape memory alloy fins 106 and provide a platform from which the shape memory alloy fins 106 may actuate (e.g. a common base). In one aspect of the disclosed embodiment, the shape memory alloy fins 106 (hereinafter, "SMA fins 106") may extend radially from the axially extending hub 107. In other aspects of the disclosed embodiment, the SMA fins 106 may be connected to the axially extending hub 107 for extension in any suitable direction. The SMA fins 106 are comprised of shape memory materials, for example, any of the shape memory materials described above. As the SMA fins 106 are connected to the axially extending hub 107, during actuation, the SMA fins 106 may exert radial pressure outwards from the axially extending hub 107 as the SMA fins 106 transition between the martensite and austenite states. In one aspect of the disclosed embodiment, the SMA fins 106 may extend radially during the actuation to provide substantially uniform pressure in the radial direction. In other aspects of the present disclosure, the SMA fins 106 may provide pressure in any suitable direction, including along one or more of a radial, axial and torsional direction. In other aspects of the present embodiment, each of the SMA fins 106 may be tailored or trained to provide different levels of radial pressure or different levels of deflection during the curing or consolidation process. The different radial pressures exerted by each of the SMA fins 106 may facilitate, for instance, the forming of complex shapes with the shape memory alloy mandrel 10. Where the shape memory alloy mandrel 10 may form a complex shape with a complex cross-sectional geometry, different levels of deflection of the shape memory alloy fins 106 may allow for a substantially uniform level of pressure along the inner perimeter of the shape memory alloy mandrel 10 to form a substantially uniformly thick composite structure. In other aspects of the disclosed embodiment, different radial pressures and deflection exerted by each of the SMA fins 106 may also facilitate the formation of shapes where different points or regions of the composite structure may be formed by different levels of radial pressures exerted by the mandrel on the composite structure. In other aspects of the present disclosure, the SMA fins 106 may also provide different regions of pressure (i.e. non-uniform pressure) along the interior perimeter of an actuation shell 101 which is described in more detail below. For instance, referring to FIG. 2C, the SMA mandrel 10 is exerting different regions of pressure such as a first region of pressure (P1), a second region of pressure (P2) and a third region of pressure (P3) on a composite structure 102. In one aspect of the present disclosure, the different regions of pressure may be arranged axially about the longitudinal axis (i.e. about the circumference of the shape memory alloy mandrel 10). However, in other aspects of the present disclosure, the different regions of pressure may be arranged perimetrically (i.e. along one or more portions of a perimeter of the compaction unit 100). This may be seen in FIG. 2D, where the SMA mandrel 10 may exert different regions of pressures P4, P5 and P6 on different portions of the perimeter of the composite structure 102. In yet another aspect of the disclosed embodiment, the different radial pressures and deflections exerted by each of the SMA fins 106 may also be trained or tailored to actuate in a sequence according to temperature instead of simultaneously. For instance, as the temperature changes, different sets of SMA fins 106 may actuate separately (e.g. actuating at different times and/or in different directions) as each of the SMA fins 106 reach their respective phase transition temperatures, providing for even more tailoring of the actuation of SMA fins 106.

Referring again to FIGS. 2 and 2B, the SMA fins 106 are coupled to an inner control layer or second SMA shell 108 so that the inner control layer/second SMA shell 108 is supported by the SMA fins 106. The inner control layer/second SMA shell 108 may be configured to act as a boundary layer between the SMA fin 106 and an SMA actuation member 104. The inner control layer/second SMA shell 108 may be of any suitable material (i.e. any materials which may handle high temperatures and high pressure situations) including SMA materials. In one aspect of the present disclosure, the inner control layer/second SMA shell 108 may help evenly distribute the radial pressures exerted by the SMA fins 106.

The shape memory alloy actuation member 104 (hereinafter "SMA actuation member 104") is an additional shape memory alloy actuating element of the shape memory alloy mandrel 10. The SMA actuation member 104 may include additional SMA elements made of an SMA material such as, for example, those described above or any other suitable SMA material. As may be seen in FIGS. 2 and 2A, the SMA actuation member 104 can be arranged in a substantially sinusoidal configuration. The sinusoidal configuration may comprise of SMA elements configured in a sinusoidal shape with substantially equally spaced sinuses (see 104A in FIG. 2B). However, in other aspects of the present disclosure, a substantially sinusoidal configuration having substantially irregularly spaced sinuses may also be possible (see 104B in FIG. 4B). The substantially sinusoidal configuration may allow tailored control over one or more of the radial, axial and torsional pressures along the circumferential cross-section of the shape memory alloy mandrel 10. The sinusoidal configuration may allow for precise tailoring of specific levels of radial pressure and deflection at specific points of the cross section of the shape memory alloy mandrel 10. The sinusoidal configuration may also allow for the application of constant pressure via the SMA actuation member 104 even across a cross section which is non-uniform in shape (i.e. a complex shape). However, in other aspects of the disclosed embodiment, the SMA actuation member 104 may also provide different regions of pressure (i.e. non-uniform pressure) along the interior perimeter of the actuation shell 101 in a manner similar to that described above with respect to SMA fins 106. In one aspect of the present disclosure, the different regions of pressure may be arranged axially about the longitudinal axis (i.e. about the circumference of the shape memory alloy mandrel 10). However, in other aspects of the present disclosure, the different regions of pressure may be arranged perimetrically (i.e. over a portion of the circumference). It is noted that the SMA actuation member 104 may be trained to actuate under different temperatures or conditions compared to the SMA fins 106. This may allow for more specific tailoring of actuation pressures. For example, the SMA fins 106 and SMA actuation member 104 may actuate sequentially (e.g., one before the other as opposed to simultaneously) as the temperature changes during the composite curing process.

Referring now to FIG. 4, a diagram showing the design process for the SMA actuation member 104 is shown. FIG. 4 specifically shows the level of control over the degree and angle of the deflection of the SMA actuation member 104 which may be obtained by tailoring the substantially sinusoidal SMA member 104 to obtain a specific level of deflection and displacement between the phase transition process. As can be seen in FIG. 4, a substantially sinusoidal SMA actuation member 104 in a first actuated state 401 and a second actuated state 402 are shown, as well as an overlay of the various actuated states 403. Referring now to FIG. 4A, an actuated form of the sinusoidal SMA actuation member 104 is shown. Referring now to FIG. 4B, the SMA actuation member 104 may have a semi-irregular sinusoidal configuration 405 having substantially unequally spaced sinuses which may specifically tailor the deflection and pressure along the surface of the shape memory alloy actuation member 104. The SMA actuation member 104 shown in FIGS. 4, 4A-B may allow for a simple, rapid and efficient manufacturing technique that will provide controlled compaction pressures within a shape memory alloy mandrel and produce uniform thickness when manufacturing complex composite part geometries. Please note that all SMA elements of the SMA mandrel 10, including the SMA fins 106 and the SMA actuation member 104, as well as the additional SMA actuation members 109 discussed further below and any other SMA elements disclosed herein, may be collectively referred to as "SMA actuators." As noted previously, the SMA actuators effects an interface pressure between the exterior contour of the SMA mandrel 10 and the structure to be cured and has a predetermined actuated shape that corresponds to a predetermined cured shape of the structure to be cured.

Referring again to FIGS. 2 and 2B, the SMA actuation member 104 is disposed substantially around an inner surface 101a of an actuation shell 101. The actuation shell 101 may be a substantially rigid shield or form sharing the longitudinal axis L with the SMA mandrel 10 and the inner surface 101a extends along the longitudinal axis L. The actuation shell 101 may be made out of metal or any other suitable rigid material. In one aspect of the present disclosure, the materials that form the actuation shell 101 may be rigid even under the high temperatures during the curing process of a composite structure. The materials that form the actuation shell 101 may also be any material which may be suitably rigid enough to withstand pressures during the curing process for the composite structure. However, in other aspects of the present disclosure, the actuation shell 101 may also be comprised of an SMA material which may provide additional pressures during the composite curing process. The inner surface 101a may interface (e.g. substantially contact) with a composite structure 102 to be cured. The actuation shell 101 may have an inner surface 101a that provides a predetermined form or a shape for the composite structure 102 to take during the curing process. The shape memory alloy actuation member 104 and SMA fins 106 provide a radially outward pressure against the composite structure 102 so that the composite structure 102 presses against the inner perimeter 101a of the actuation shell 101 during the curing process where the composite structure 102 takes on the predetermined shape of the actuation shell 101 after curing. The pressures generated by the SMA actuation member 104 and SMA fins 106 may facilitate the curing of the composite structure 102 against the actuation shell 101. In one aspect of the present disclosure, the actuation shell 101 may have a substantially circular cross section, as shown in FIG. 2. However, in other aspects of the present disclosure, the actuation shell 101 may take substantially any suitable form or shape (for example, see FIGS. 4C-E for additional exemplary cross-sections of the actuation shell 101).

As mentioned above, the composite structure 102 to be cured may be positioned between the shape memory alloy actuation member 104 and the actuation shell 101 during the curing process. In an aspect of the present disclosure, the shape memory alloy mandrel 10 has an outer boundary layer or first SMA shell 103 (shown in FIG. 3) of any suitable material (for example, SMA materials) between the SMA actuation member 104 and the composite structure 102 to provide for even distribution of pressure exerted by the SMA actuation member 104 during the curing process. In one aspect of the disclosed embodiment, the SMA actuation member 104 is disposed between and connected to the first SMA shell 103 and the second SMA shell 108. The outer boundary layer/first SMA shell 103 has an interior forming an interior space. The outer boundary layer/first SMA shell 103 may have a substantially non-uniform cross section in one or more of radial and longitudinal directions with respect to the longitudinal axis so as to form at multiple interior regions, for example a first interior region (R1) and second interior region (R2) (see, for instance, block 504 of FIG. 5). However, in other aspects, the outer boundary layer/first SMA shell 103 may take any suitable cross-section. Outer boundary layer/first SMA shell 103 may have any suitable configuration to allow the release of the composite structure 102 from the outer boundary layer/first SMA shell 103 and thus a release from the SMA mandrel 10. The outer boundary layer/first SMA shell 103 shares a longitudinal axis L with the SMA mandrel 10. The composite structure 102 may be any suitable structure which may be cured or formed by a mandrel. For example, the composite structure 102 may be a braided composite structure which may be cured and shaped by the mandrel. In an alternate aspect of the present disclosure, the composite structure 102 may be any suitable material, for example, thermoplastics, resin structures, metal or any other material which may be shaped, formed or cured by a mandrel. During the curing process, compaction pressure may be exerted along a radial or axial direction upon the composite structure 102 by the SMA fins 106 and SMA actuation member 104. When the SMA mandrel 10 is actuated during the curing process, the exterior contour of the SMA mandrel 10 may have a predetermined actuated shape that corresponds to the predetermined cured shape of the composite structure 102.

Referring now to FIG. 3, another aspect of a SMA mandrel 10A of a compaction unit 100A is illustrated. The structures of FIG. 3 may substantially correspond to the structures shown in FIG. 2. In one aspect of the disclosed embodiment, the SMA actuator mandrel 10 has a number of longitudinal SMA actuation members 109 in addition to SMA fins 106 and SMA actuation member 104. The longitudinal SMA actuation members 109 extend substantially along the longitudinal axis L and interface with the SMA actuation member 104 via the outer boundary layer/first SMA shell 103 and the composite structure 102 via a second boundary layer/boundary SMA shell 110. The outer boundary layer/first SMA shell 103 and boundary layer/boundary SMA shell 110 may allow for even distribution of radial and/or axial pressures during the deflection of the SMA actuation member 104 and the longitudinal SMA actuation members 109 during the curing process. As noted previously, the SMA actuators effects an interface pressure between the exterior contour of the second boundary layer/boundary SMA shell 110 and the composite structure 102 to be cured and has a predetermined actuated shape that corresponds to a predetermined cured shape of the composite structure 102 to be cured. In one aspect of the present disclosure, the longitudinal SMA actuation members 109 may be attached or fixed to the boundary layer 103 and secondary boundary layer 110 to prevent shifting of the longitudinal SMA actuation members 109 and to better enable transfer of actuation pressure during the curing process. The longitudinal SMA actuation members 109 may also be arranged in an equally spaced and evenly distributed manner within the boundary layer 103 and boundary layer/boundary SMA shell 110. In one aspect of the present disclosure, the longitudinal SMA actuation members 109 may be in the form of a plurality of SMA rods (see, for instance, SMA actuation member 109'), which may deflect in shape and position in addition to the SMA fins 106 and SMA actuation member 104 during the curing process. The longitudinal SMA actuation members 109 may allow for greater radial and/or axial expansion or deflection compared to the SMA mandrel 10 of FIG. 2 alone during the curing process. The longitudinal SMA actuation members 109 may also provide torsional forces that twist at least a portion of the composite structure 102. The longitudinal SMA actuation members 109 may also allow for greater transfer pressure to be placed on the composite structure 102 during the curing process.

The longitudinal SMA actuation members 109 may also be trained with different parameters than those of SMA fins 106 and the SMA actuation member 104. The longitudinal SMA actuation members 109 may react to different conditions, for example, different temperatures from those of the SMA fins 106 and SMA actuation member 104. This may allow for sequential actuation of the SMA fins 106 (e.g., one before the other as opposed to simultaneously), SMA actuation member 104 and longitudinal SMA actuation members 109 at different temperatures at different points of the curing process. The sequential actuation of the various SMA components of the SMA actuator mandrel 10A may allow for more refined tailoring of actuation pressures during the curing process. Further, individual longitudinal SMA actuation members 109 may be tailored to provide different actuation at different temperatures to further allow greater control over the curing and actuation process. The longitudinal SMA actuation members 109 may provide substantially uniform pressure one or more of an axial, radial and torsional direction against the interior perimeter surface 101a of the actuation shell 101. In other aspects of the present disclosure, the longitudinal SMA actuation members 109 may also provide different regions of pressure (i.e. non-uniform pressure) along the interior perimeter of the actuation shell 101 in a manner similar to that described above. In one aspect of the present disclosure, the different regions of pressure may be arranged axially about the longitudinal axis (i.e. about the circumference of the shape memory alloy mandrel 10A). However, in other aspects of the present disclosure, the different regions of pressure may be arranged perimetrically in a manner similar to that described above.

The longitudinal SMA actuation members 109 may be in the form of, for instance, SMA tubes or rods, as seen in FIGS. 3 and 3A. In alternate aspects, the longitudinal SMA actuation members 109 may also take any suitable configurations or shapes. The longitudinal SMA actuation members 109 may exert pressure against the composite structure 102 and actuate along any suitable direction relative to the longitudinal axis L of the SMA mandrel 10A. Referring now to FIGS. 3 and 3A, the longitudinal SMA actuation member 109 may have a substantially circular cross section as seen in longitudinal SMA actuation member 109'. However, referring now to FIG. 3B, the longitudinal SMA actuation member 109" may have a substantially arctuate (i.e. U-shaped) cross section. The substantially arctuate cross section of the longitudinal SMA actuation member 109" may allow for the exertion of pressure along the top surface 109A" of the arctuate cross section and the bottom surfaces 109B" to further tailor the points or regions at which the pressure is exerted on the composite structure 102. In other aspects of the present disclosure, the longitudinal SMA actuation member 109" may have any suitable configuration.

Referring now to FIG. 4C-E, the SMA mandrel 10, 10A may have any suitable shape or form and the SMA actuation member 104, SMA fins 106 and longitudinal SMA actuation members 109 may also have any suitable shape. For instance, in FIG. 4C, the SMA mandrel may include a hendecagonal actuation shell 101A and a pentagonal mandrel 10B. In other aspects, the SMA mandrel may have a substantially rectangular actuation shell 101B and a substantially rectangular mandrel 10C (see FIG. 4D), or a square mandrel 10D and a square actuation shell 101C (see FIG. 4E). The mandrels 10B-D and actuation shells 101A-C may be substantially similar to one or more of the mandrels 10, 10A and actuation shell 101. In other aspects, the mandrels 10B-D and actuation shells 101A-C may have any suitable shapes. The mandrels 10B-D may have a different shape than the actuation shells 101A-C. For instance, the hendecagonal actuation shell 101A may be utilized with a pentagonal mandrel 10B as shown in FIG. 4C. The different shapes between the actuation shell 101A and mandrel 10B may facilitate further tailoring of pressure exerted on each part or region of the composite structure 102 positioned between the mandrel 10B and actuation shell 101A. Referring now to FIG. 5, an exemplary flow diagram of a method of curing a composite structure is shown. The method is described with respect to SMA mandrel 10 as shown in FIG. 2, but may be similarly applied using the SMA mandrel 10A as well as the SMA mandrels shown in FIGS. 4C-E. At block 501, a braided tube or other composite structure 102 is provided in an uncured state. The composite structure 102 is placed inside actuation shell 101 and the SMA mandrel 10 may be placed inside the composite structure 102 to be formed. In other aspects, the composite structure 102 may be placed over the SMA mandrel 10 and then inserted into the actuation shell 101 as a unit. The SMA mandrel 10 may be substantially similar to the SMA mandrels 10, 10A as described above. At block 503, heat is applied to the SMA mandrels 10 as part of the curing process. At block 504, the heat in the curing process causes one or more of the SMA actuators (i.e. SMA fins 106, SMA actuation member 104 and longitudinal SMA actuation members 109) to be actuated. One or more of the SMA fins 106 and SMA actuation member 104 and longitudinal SMA actuation members 109 actuate to generate one or more of an axial, radial, and torsional pressure. The actuation of the SMA actuators of the SMA mandrel 10 may generate a substantially controlled generally outward radial pressure on the composite structure 102. When one or more of the SMA fins 106 and SMA actuation member 104 and longitudinal SMA actuation members 109 are actuate during the curing process, the exterior contour of the SMA mandrel 10 may have a predetermined actuated shape that corresponds to the predetermined cured shape of the composite structure 102. As may be see in block 504, the SMA fins 106, SMA actuation member 104 and longitudinal SMA actuation members 109 are tailored to generate substantially uniform pressure even along the different non-uniform points or regions of the actuation shells 101, 101A-C to further customize the curing of the composite structure.

Referring now to FIG. 6, an exemplary flowchart for the tailoring of compaction pressures upon a composite structure 102 by SMA mandrels 10, 10A-D during the curing process is shown. At block 601, the structural geometry of a composite structure surface to be made by the SMA mandrel is defined. Once a structural geometry of the composite structure is defined, at block 602, the geometry of the composite structure is analyzed to identify the pressure(s) (and directions thereof) and temperature(s) needed for the curing process to form the composite structure. At block 603, based on the identified pressure and temperatures for the composite structure curing process, suitable SMA mandrel materials as well as a configuration of the SMA mandrel can be selected. This may include, for instance, the configuration of the geometry of the actuation shell 101, 101A-C, as well as the shape and configuration of the SMA mandrel 10, 10A (e.g. SMA fins 106, SMA actuation member 104 and longitudinal SMA actuation members 109) to provide the predetermined pressures for effecting the curing of composite structure 102. The actuation shell 101, 101A-C may have an interior contour that corresponds to the defined structural geometry of the composite structure. When actuated, the SMA mandrel 10, 10A may also an exterior contour that has a predetermined shape that corresponds to the defined structural geometry of the composite structure. As noted above, the SMA actuators may be actuated at different times during the curing process. At block 604, the actuation training process for the SMA actuators is defined. As the training process for the SMA actuator mandrel is being carried out, the testing of the SMA actuator mandrel may allow a return to block 602 to further identify pressure and temperatures for the curing process as the SMA actuator mandrel is iteratively improved during the training process.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 7 and an aircraft 1102 as shown in FIG. 8. Specifically, the SMA actuator mandrels described herein may be employed, for instance, in any stage of aircraft manufacturing and the composite structures formed by the SMA actuator mandrels may form any suitable part of an aircraft or component used in aircraft design and manufacture. During pre-production, illustrative method 1100 may include specification and design 1104 of the aircraft 1102 and material procurement 1106. During production, component and subassembly manufacturing 1108 and system integration 1110 of the aircraft 1102 take place. The SMA actuator mandrels described herein may be employed as part of the component and subassembly manufacturing process 1108. In other aspects, the SMA actuator mandrels may also be employed as part of the specification and design 1104 for the SMA actuator mandrel design process. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, the aircraft 1102 produced by the illustrative method 1100 may include an airframe 1118 with a plurality of high-level systems and an interior 1122. Examples of high-level systems include one or more of a propulsion system 1124, an electrical system 1126, a hydraulic system 1128, and an environmental system 1130. Examples of systems which may include composite components formed by an SMA mandrel may include propulsion system 1124, electrical system 1126, hydraulic system 1128 and environmental system 1130. Although an aerospace example is shown, the principles of the invention may be applied to other industries, such as the automotive and maritime industries.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

In one or more aspects of the present disclosure, a mandrel is disclosed. The mandrel having a shape memory alloy (SMA) shell having a longitudinal axis, an interior extending along the longitudinal axis and an exterior contour, the SMA shell being configured to interface with a structure to be cured, and at least one SMA actuation member disposed within the interior and connected to the SMA shell, where the at least one SMA actuation member is configured to exert pressure against the SMA shell effecting an interface pressure between the exterior contour of the SMA shell and the structure to be cured.

In one or more aspects of the present disclosure, wherein the at least one SMA actuation member further comprises at least one SMA element arranged in a substantially sinusoidal configuration.

In one or more aspects of the present disclosure, wherein the at least one SMA element may be arranged in a substantially sinusoidal configuration having unequally spaced sinuses.

In one or more aspects of the present disclosure, further comprising a second SMA shell, the at least one SMA actuation member being disposed between and connected to the SMA shell and the second SMA shell.

In one or more aspects of the present disclosure, further comprising SMA actuation fins connected to the second SMA shell and being configured to effect an axial pressure, along the longitudinal axis, between the structure to be cured and the exterior contour of the SMA shell.

In one or more aspects of the present disclosure, further comprising an axially extending hub connected to the SMA actuation fins and being configured to stabilize the SMA actuation fins along the longitudinal axis In one or more aspects of the present disclosure, wherein at least one of the SMA actuation fins and the at least one SMA actuation member are configured to effect differing pressure regions against the SMA shell.

In one or more aspects of the present disclosure, wherein the at least one SMA actuation member effects a radially outward pressure on the SMA shell.

In one or more aspects of the present disclosure, wherein the at least one SMA actuation member is disposed around a perimeter of the SMA shell.

In one or more aspects of the present disclosure, wherein the at least one SMA actuation member is configured to effect at least a first pressure region and a second pressure region where the pressure exerted against the SMA shell in the first pressure region is different than a pressure exerted against the SMA shell in the second pressure region.

In one or more aspects of the present disclosure, wherein the first and second pressure regions are arranged axially along the longitudinal axis.

In one or more aspects of the present disclosure, wherein the first and second pressure regions are arranged perimetrically about the longitudinal axis.

In one or more aspects of the present disclosure, wherein the SMA shell has a substantially non-uniform cross section in one or more of radial and longitudinal directions with respect to the longitudinal axis so as to form at least a first interior region and a second interior region.

In one or more aspects of the present disclosure, wherein the at least one SMA actuation member is configured to exert substantially the same pressure against the SMA shell in the first interior region and the second interior region.

In one or more aspects of the present disclosure, further comprising longitudinally extending SMA members connected to the SMA shell, the longitudinally extending SMA member being configured to effect one or more of a longitudinal bending or torsion of the mandrel about the longitudinal axis.

In one or more aspects of the present disclosure, a mandrel is disclosed. The mandrel having a first shape memory alloy (SMA) shell having a longitudinal axis, an exterior contour and forming an interior space, the exterior contour of the first SMA shell being configured to interface with a composite to be cured, and at least one SMA actuation member disposed within the interior space and being configured to effect regions of expansion pressure against the first SMA shell and effecting a transfer of expansion pressure to the composite to be cured.

In one or more aspects of the present disclosure, wherein the regions comprise at least a first pressure region and second pressure region where the pressure exerted against the first SMA shell in the first pressure region is different than a pressure exerted against the first SMA shell in the second pressure region.

In one or more aspects of the present disclosure, wherein the at least one SMA actuation member is configured to provide at least a radial and axial expansion pressure relative to the longitudinal axis.

In one or more aspects of the present disclosure, further comprising a boundary SMA shell disposed outward of the first SMA shell and at least one longitudinally extending SMA member disposed between and connecting the first SMA shell and the boundary SMA shell so as to transfer expansion pressure from the at least one SMA actuation member to the composite.

In one or more aspects of the present disclosure, wherein the at least one longitudinally extending SMA member comprises a plurality of longitudinally extending SMA rods spaced about a circumference of the first SMA shell.

In one or more aspects of the present disclosure, wherein the at least one longitudinally extending SMA member is configured to effect one or more of a torsional and bending force to the composite along the longitudinal axis.

In one or more aspects of the present disclosure, wherein the at least one longitudinally extending SMA member is configured to have a substantially rod shape.

In one or more aspects of the present disclosure, wherein the at least one longitudinally extending SMA member is configured to have a substantially arctuate shape.

In one or more aspects of the present disclosure, wherein the at least one SMA actuation member comprises one or more of a circumferentially arranged SMA and a radially arranged SMA element.

In one or more aspects of the present disclosure, a method of forming a composite structure to be cured is disclosed. The method including placing the composite structure to be cured around a shape memory alloy (SMA) mandrel, and exerting a pressure against an SMA shell of the SMA mandrel so that the pressure is transferred to the composite structure to be cured by an exterior contoured surface of the SMA mandrel with at least one SMA member of the SMA mandrel.

In one or more aspects of the present disclosure, wherein the pressure is exerted in multiple directions relative to a longitudinal axis of the SMA mandrel.

In one or more aspects of the present disclosure, further comprising placing an actuation shell over the composite structure to be cured where the SMA mandrel effects compression of the composite structure to be cured against the actuation shell.

In one or more aspects of the present disclosure, a method of tailoring pressure on a structure with a shape memory alloy (SMA) mandrel is disclosed. The method including defining a geometry of a composite structure to be cured during a curing process, identifying pressures and temperatures for the curing process for the composite structure, designing the SMA mandrel by matching the SMA mandrel with the identified pressures and temperatures where the SMA mandrel is contoured to a cured geometry of the composite structure, and assembling the SMA mandrel, placing the assembled SMA model within the composite structure to be cured so that a contoured exterior surface of the SMA mandrel is in contact with the composite structure, and curing the composite structure.

In one or more aspects of the present disclosure, a system for forming a composite structure is disclosed, the system having an actuation shell having an interior extending along a longitudinal axis and an interior contour, a shape memory alloy (SMA) shell having a longitudinal axis, an interior extending along the longitudinal axis and an exterior contour, the SMA shell being configured to interface with a composite structure to be cured, and at least one SMA actuation member disposed within the interior and connected to the SMA shell, where the at least one SMA actuation member is configured to exert pressure against the SMA shell effecting an interface pressure between the exterior contour of the SMA shell and the interior contour of the actuation shell to compress the composite structure for curing the composite structure and effecting a predetermined cured shape of the composite structure.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A mandrel comprising:
   a shape memory alloy (SMA) shell having a longitudinal axis, an interior extending along the longitudinal axis and an exterior contour, the SMA shell being configured to interface with a structure to be cured;
   at least one SMA actuation member disposed within the interior and connected to the SMA shell, where the at least one SMA actuation member is configured to exert pressure against the SMA shell effecting an interface pressure between the exterior contour of the SMA shell and the structure to be cured where the exterior contour has a predetermined actuated shape that corresponds to a predetermined cured shape of the structure to be cured;
   longitudinally extending SMA members connected to the SMA shell, the longitudinally extending SMA members being configured to effect one or more of a longitudinal bending or torsion of the mandrel about the longitudinal axis; and
   a second SMA shell, the at least one SMA actuation member being disposed between and connected to the SMA shell and the second SMA shell.

2. The mandrel of claim 1, wherein the at least one SMA actuation member further comprises at least one SMA element arranged in a substantially sinusoidal configuration.

3. The mandrel of claim 2, wherein the at least one SMA element may be arranged in a substantially sinusoidal configuration having unequally spaced sinuses.

4. The mandrel of claim 1, further comprising SMA actuation fins connected to the second SMA shell and being configured to effect an axial pressure, along the longitudinal axis, between the structure to be cured and the exterior contour of the SMA shell.

5. The mandrel of claim 4, further comprising an axially extending hub connected to the SMA actuation tins and being configured to stabilize the SMA actuation fins along the longitudinal axis.

6. The mandrel of claim 4, wherein at least one of the SMA actuation fins and the at least one SMA actuation member are configured to effect differing pressure regions against the SMA shell.

7. The mandrel of claim 1, wherein the at least one SMA actuation member effects a medially outward pressure on the SMA shell.

8. The mandrel of claim 1, wherein the SMA shell has a substantially non-uniform cross section in one or more of radial and longitudinal directions with respect to the longitudinal axis so as to form at least a first interior region and a second interior region.

9. The mandrel of claim 8, wherein the at least one SMA actuation member is configured to exert substantially the same pressure against the SMA shell in the first interior region and the second interior region.

10. A mandrel comprising:
    a first shape memory alloy (SMA) shell having a longitudinal axis, an exterior contour and forming an interior space, the exterior contour of the first SMA shell being configured to interface with a composite to be cured; and
    at least one SMA actuation member disposed within the interior space and being configured to effect regions of expansion pressure against the first SMA shell and effecting a transfer of expansion pressure to the composite to be cured;
    at least one longitudinally extending SMA member connected to the first SMA shell, the longitudinally extending SMA members being configured to effect one or more of a longitudinal bending or torsion of the mandrel about the longitudinal axis; and
    a boundary SMA shell disposed outward of the first SMA shell and the at least one longitudinally extending SMA member is disposed between and connecting the first SMA shell and the boundary SMA shell so as to transfer expansion pressure from the at least one SMA actuation member to the composite.

11. The mandrel of claim 10, wherein the regions comprise at least a first pressure region and second pressure region where the pressure exerted against the first SMA shell in the first pressure region is different than a pressure exerted against the first SMA shell in the second pressure region.

12. The mandrel of claim 10, wherein the at least one SMA actuation member is configured to provide at least a radial and axial expansion pressure relative to the longitudinal axis.

13. The mandrel of claim 10, wherein the at least one longitudinally extending SMA member comprises a plurality of longitudinally extending SMA rods spaced about a circumference of the first SMA shell.

14. The mandrel of claim 10, wherein the at least one SMA actuation member comprises one or more of a circumferentially arranged SMA and a radially arranged SMA element.

15. A method of forming a composite structure comprising:
    placing the composite structure to be cured around a shape memory alloy (SMA) mandrel;
    exerting a pressure against an SMA shell of the SMA mandrel so that the pressure is transferred to the composite structure to be cured by an exterior contoured surface of the SMA mandrel with at least one SMA actuation member disposed within an interior of the SMA mandrel and connected to the SMA shell where the exterior contour has a predetermined actuated shape that corresponds to a predetermined cured shape of the composite structures;

exerting one or more of a longitudinal bending or torsion of the SMA mandrel, about a longitudinal axis of the SMA mandrel, with at least one longitudinally extending SMA member connected to the SMA shell; and wherein a boundary SMA shell is disposed outward of the SMA shell and the at least one longitudinally extending SMA member is disposed between and connecting the SMA shell and the boundary SMA shell for transferring expansion pressure from the at least one SMA actuation member to the composite structure.

16. The method of claim 15, wherein the pressure is exerted in multiple directions relative to the longitudinal axis of the SMA mandrel.

17. The method of claim 15, further comprising placing an actuation shell over the composite structure to be cured where the SMA mandrel effects compression of the composite structure to be cured against the actuation shell.

18. The mandrel of claim 11, wherein the at least one SMA actuation member further comprises at least one SMA element arranged in a substantially sinusoidal configuration.

19. The mandrel of claim 1, wherein the at least one SMA actuation member is configured to effect at least a first pressure region and a second pressure region where the pressure exerted against the SMA shell in the first pressure region is different than a pressure exerted against the SMA shell in the second pressure region.

20. The mandrel of claim 19, wherein the first pressure region and the second pressure region are arranged axially along the longitudinal axis or are arranged perimetrically about the longitudinal axis.

* * * * *